United States Patent
Nagata

(10) Patent No.: US 8,526,805 B2
(45) Date of Patent: Sep. 3, 2013

(54) LENS APPARATUS AND CAMERA SYSTEM INCLUDING THE SAME

(75) Inventor: Katsuhiko Nagata, Saitama (JP)

(73) Assignee: Canon Kabushiki Kaisha (JP)

( * ) Notice: Subject to any disclaimer, the term of this patent is extended or adjusted under 35 U.S.C. 154(b) by 83 days.

(21) Appl. No.: 13/331,079

(22) Filed: Dec. 20, 2011

(65) Prior Publication Data

US 2012/0155844 A1   Jun. 21, 2012

(30) Foreign Application Priority Data

Dec. 20, 2010   (JP) ................................. 2010-283504

(51) Int. Cl.
G03B 17/00   (2006.01)

(52) U.S. Cl.
USPC .......................................................... 396/77

(58) Field of Classification Search
USPC ...................................... 396/77, 78
See application file for complete search history.

(56) References Cited

U.S. PATENT DOCUMENTS

| | | | |
|---|---|---|---|
| 6,134,390 A | 10/2000 | Kasuya | |
| 6,344,933 B1 * | 2/2002 | Yajima | 359/697 |
| 6,370,332 B1 | 4/2002 | Kubo | |
| 2012/0155844 A1 * | 6/2012 | Nagata | 396/77 |

FOREIGN PATENT DOCUMENTS

| | | |
|---|---|---|
| JP | 10-282396 A | 10/1998 |
| JP | 2000-352655 A | 12/2000 |

* cited by examiner

*Primary Examiner* — W B Perkey
(74) *Attorney, Agent, or Firm* — Rossi, Kimms & McDowell LLP

(57) ABSTRACT

A lens apparatus includes a zoom, a focus, a zoom position control signal generator, a focus position control signal generator, a first calculator for calculating a present angle of field from zoom and focus positions, a second calculator for calculating a second angle of field based on a zoom control signal and a focus position, a third calculator for calculating a third angle of field based on zoom and focus position control signals, used when the second calculation unit calculates, a base angle-of-field determinater for determining a sum of the present angle of field and a value obtained by subtracting the third angle of field from the second angle of field, as a base angle of field, and a zoom position control determinater for determining a zoom position to a position of the zoom lens corresponding to the base angle of field to which the zoom lens is driven.

6 Claims, 8 Drawing Sheets

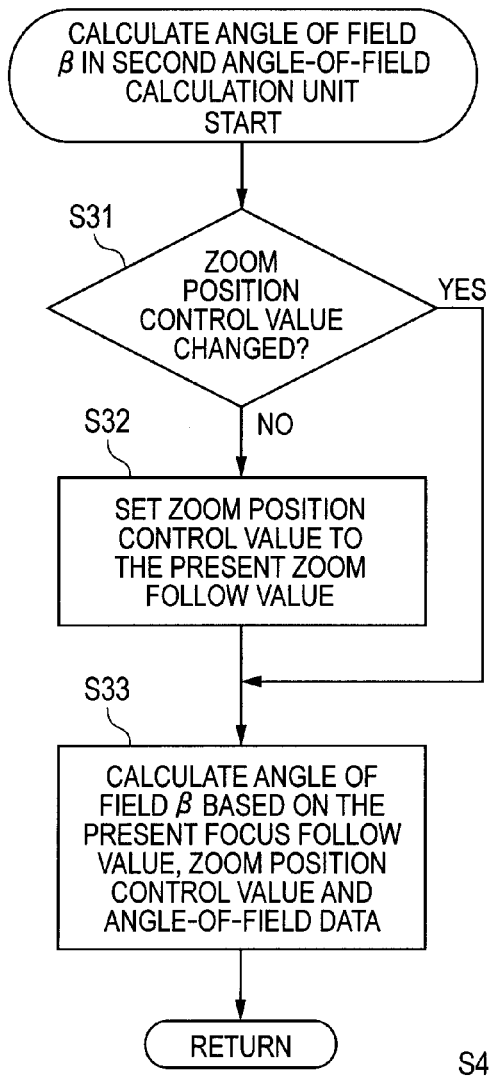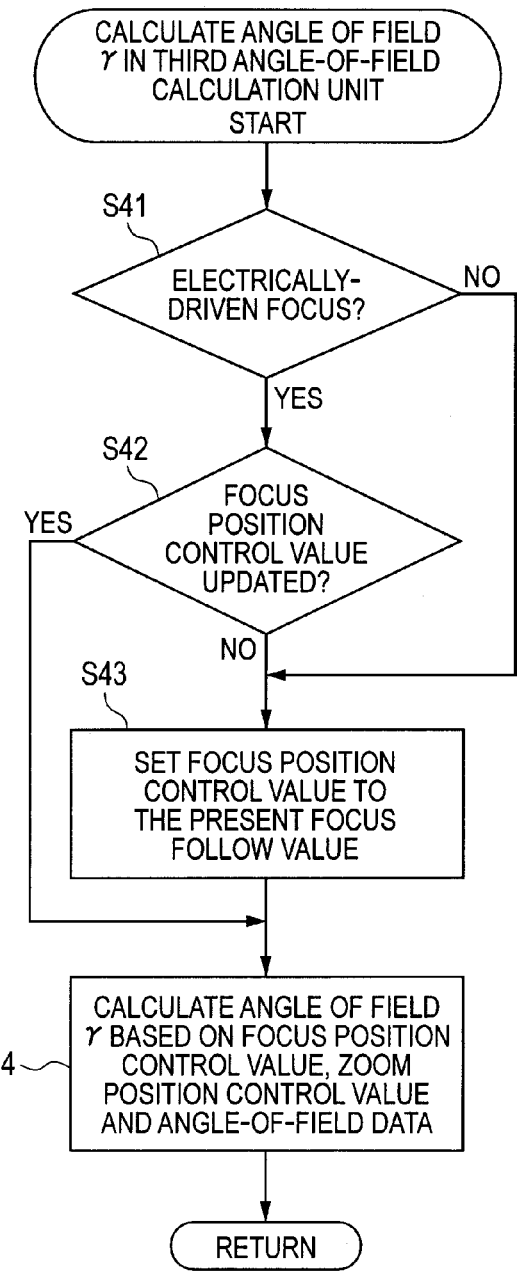

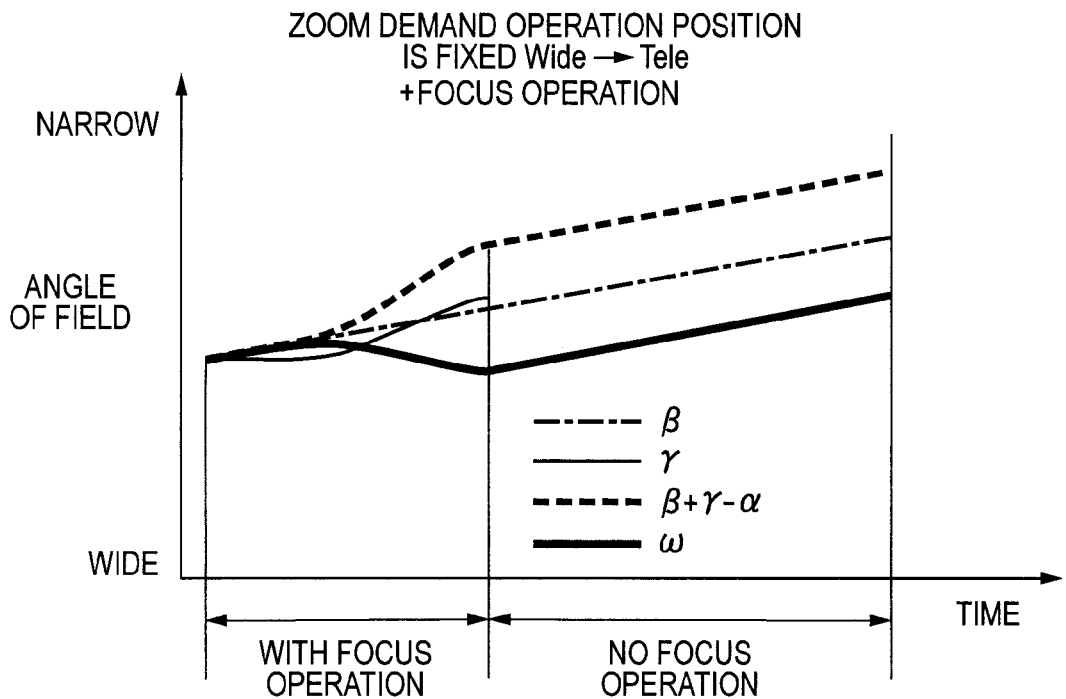
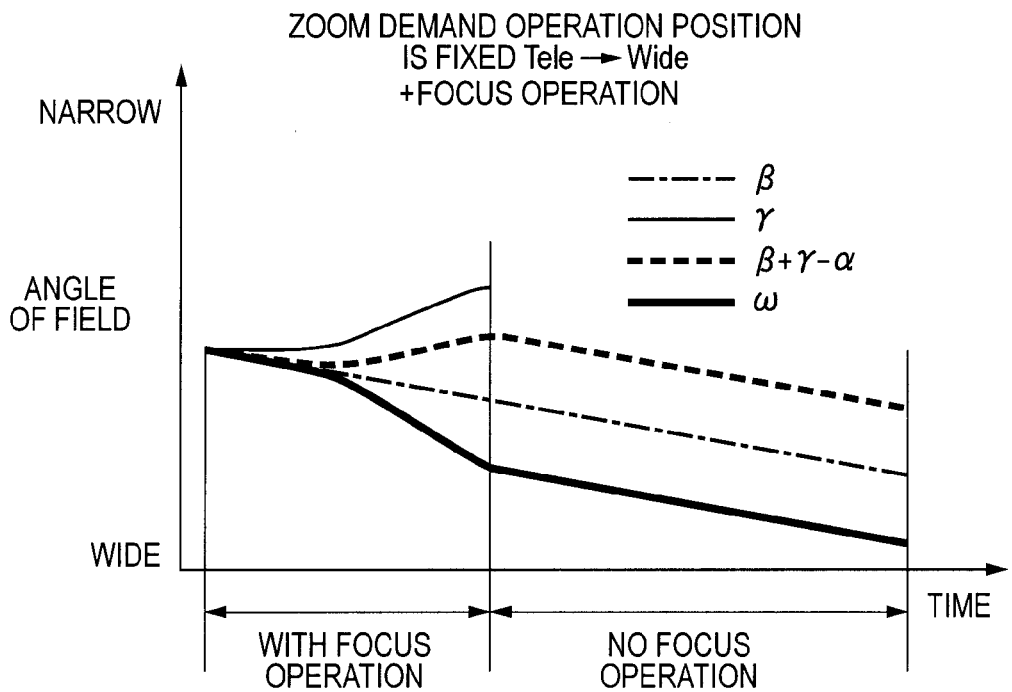

LENS APPARATUS AND CAMERA SYSTEM INCLUDING THE SAME

BACKGROUND OF THE INVENTION

1. Field of the Invention

The present invention relates to a lens apparatus, and more particularly, to a lens apparatus for correcting a change in an angle of field in a focus operation by driving zoom lens unit, and to a camera system including the lens apparatus.

2. Description of the Related Art

In a conventional zoom lens, it is known that an angle of field of an image is changed due to driving of a focus lens when a focus operation is performed. When the zoom lens is not operated, the image is moved because of a change in the angle of field due to the focus operation (a change in the angle of field occurs) in such photography that the focal point in the image is moved from a subject to another subject. Therefore, there is proposed a lens unit having an angle-of-field correction function that is a technology of eliminating the change in the angle of field by activating zooming.

For instance, Japanese Patent Application Laid-Open No. H10-282396 discloses a technology of correcting the change in the angle of field due to driving of the focus lens by driving a zoom lens. Japanese Patent Application Laid-Open No. 2000-352655 discloses the angle-of-field correction function for correcting the change in the angle of field due to driving of the focus lens by driving the zoom lens and discloses a technology of inhibiting the angle-of-field correction function.

However, in the conventional technologies disclosed in Japanese Patent Application Laid-Open No. H10-282396 and Japanese Patent Application Laid-Open No. 2000-352655, the change in the angle of field due to focus driving is not corrected when zoom and focus are being operated simultaneously. It is desirable that the angle of field intended by a photographer be reflected on the image displayed by operation using a zoom operation unit. However, if the change in the angle of field due to focusing varies at a rate that cannot be neglected with respect to a change in the angle of field due to a zooming operation, an operation amount in the zoom operation unit and the change in the angle of field in the image are not agreed with each other. Then, an image intended by the photographer cannot be generated.

SUMMARY OF THE INVENTION

The present invention has been made in view of the above, and therefore has an object to provide a zoom lens that enables to realize an angle of field intended by a photographer even if zoom and focus are operated simultaneously.

In order to achieve the above-mentioned object, according to the present invention, there is provided a lens apparatus, including: a zoom lens; a focus lens; a zoom driving unit for driving the zoom lens; a zoom position detector for detecting a position of the zoom lens; a focus position detector for detecting a position of the focus lens; a zoom position control signal generator for generating a zoom position control signal indicating a position of the zoom lens; a focus position control signal generator for generating a focus position control signal indicating a position of the focus lens; a first angle-of-field calculation unit for calculating a first angle of field as a present angle of field based on the position of the zoom lens from the zoom position detector and the position of the focus lens from the focus position detector; a second angle-of-field calculation unit for calculating a second angle of field based on the position of the zoom lens indicated by the zoom position control signal and the position of the focus lens from the focus position detector; a third angle-of-field calculation unit for calculating a third angle of field based on the position of the zoom lens indicated by the zoom position control signal and the position of the focus lens indicated by the focus position control signal, which are used when the second angle-of-field calculation unit calculates; a base angle-of-field determination unit for determining a sum of the first angle of field and a value obtained by subtracting the third angle of field from the second angle of field, as a base angle of field; and a zoom position control determination unit for determining the position of the zoom lens to a position of the zoom lens corresponding to the base angle of field, in which the zoom driving unit drives the zoom lens to the position of the zoom lens determined by the zoom position control determination unit.

According to the present invention, there can be provided a zoom lens that realizes an angle of field intended by a photographer even if zoom and focus are operated simultaneously.

Further features of the present invention will become apparent from the following description of exemplary embodiments with reference to the attached drawings.

BRIEF DESCRIPTION OF THE DRAWINGS

FIG. 5 is a flowchart of a process in a second angle-of-field calculation unit.

FIG. 6 is a flowchart of a process in a third angle-of-field calculation unit.

FIG. 9 is a graph illustrating a change in the angle of field (the same direction of change in the angle of field between zoom and focus operations).

FIG. 10 is a graph illustrating a change in the angle of field (opposite directions of change in the angle of field between zoom and focus operations).

DESCRIPTION OF THE EMBODIMENTS

Hereinafter, exemplary embodiments of the present invention are described in detail with reference to the attached drawings.

First Embodiment

Figure 1:
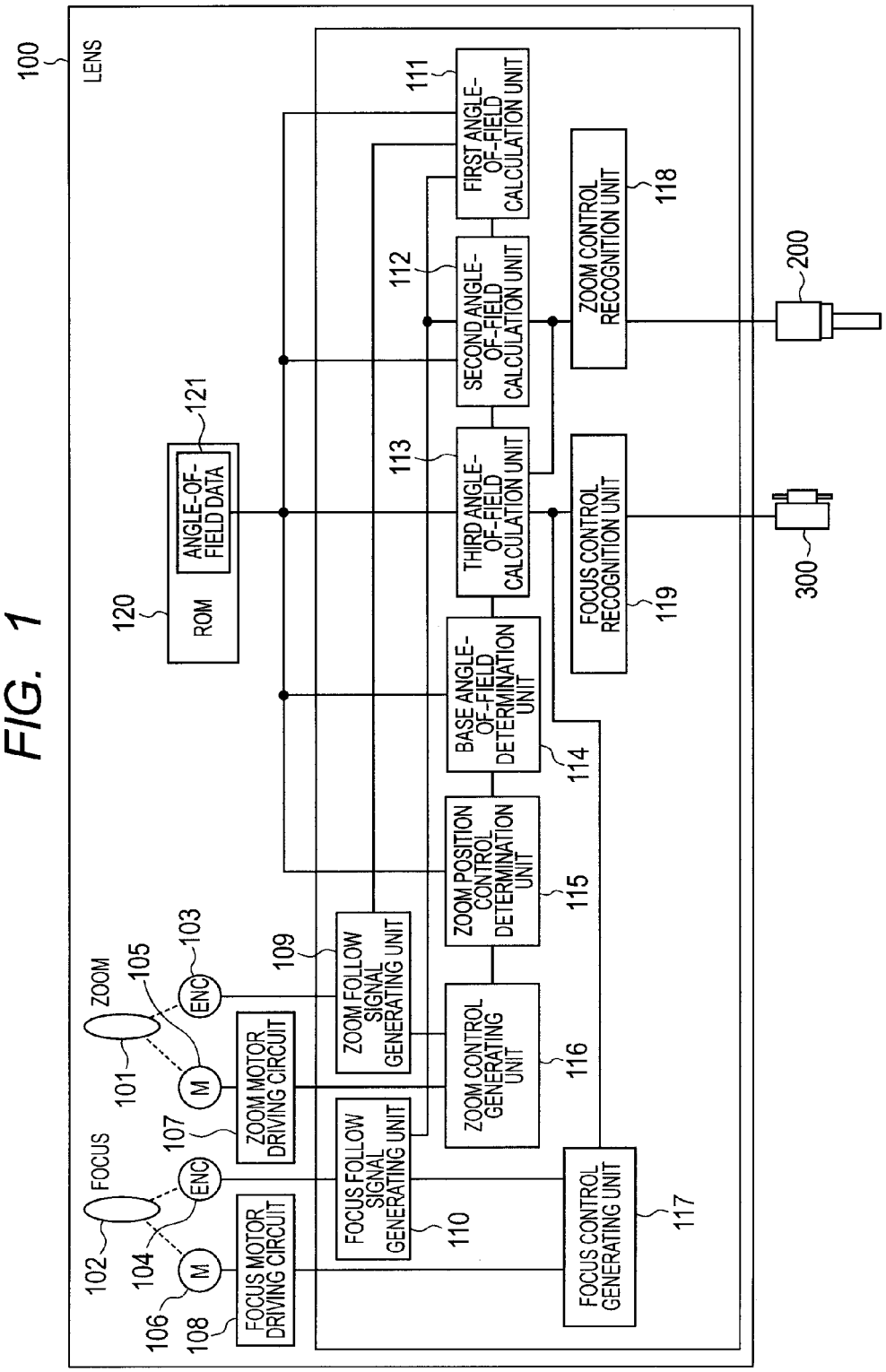
FIG. 1 is a block diagram of a lens apparatus according to a first embodiment of the present invention.

Hereinafter, with reference to FIG. 1, a structure of a lens apparatus according to a first embodiment of the present invention is described.

A lens apparatus 100 of this embodiment includes a zoom lens 101, a focus lens 102, a zoom lens driving motor 105 for driving the zoom lens 101, and a focus driving motor 106 for driving the focus lens 102. Each of the zoom lens 101 and the focus lens 102 can perform an electric action by using the zoom lens driving motor 105 or the focus driving motor 106, and can perform a manual operation without using the zoom lens driving motor 105 or the focus driving motor 106.

In addition, a position of the zoom lens 101 is detected by a zoom encoder 103 serving as a zoom position detector. A position of the focus lens 102 is detected by a focus encoder 104 as a focus position detector. A zoom follow signal generator 109 and a focus follow signal generator 110 count pulses which are outputs of the zoom encoder 103 and the focus encoder 104 so as to generate a zoom follow signal and a focus follow signal indicating positions of the zoom lens 101 and the focus lens 102, respectively. A value of the zoom follow signal and a value of the focus follow signal (referred to as zoom follow value and focus follow value, respectively) indicate a position of the zoom lens and a position of the focus lens, respectively. The lens apparatus 100 includes a zoom control generator 116 and a zoom motor driving circuit 107 for controlling the zoom driving motor 105. The lens apparatus 100 drives the zoom lens driving motor 105 via the zoom motor driving circuit 107 based on a signal generated in the zoom control generator 116. In addition, the lens apparatus 100 includes a focus control generator 117 and a focus motor driving circuit 108 for controlling the focus driving motor 106. The lens apparatus 100 drives the focus driving motor 106 via the focus motor driving circuit 108 based on a signal generated in the focus control generator 117.

Figure 2:
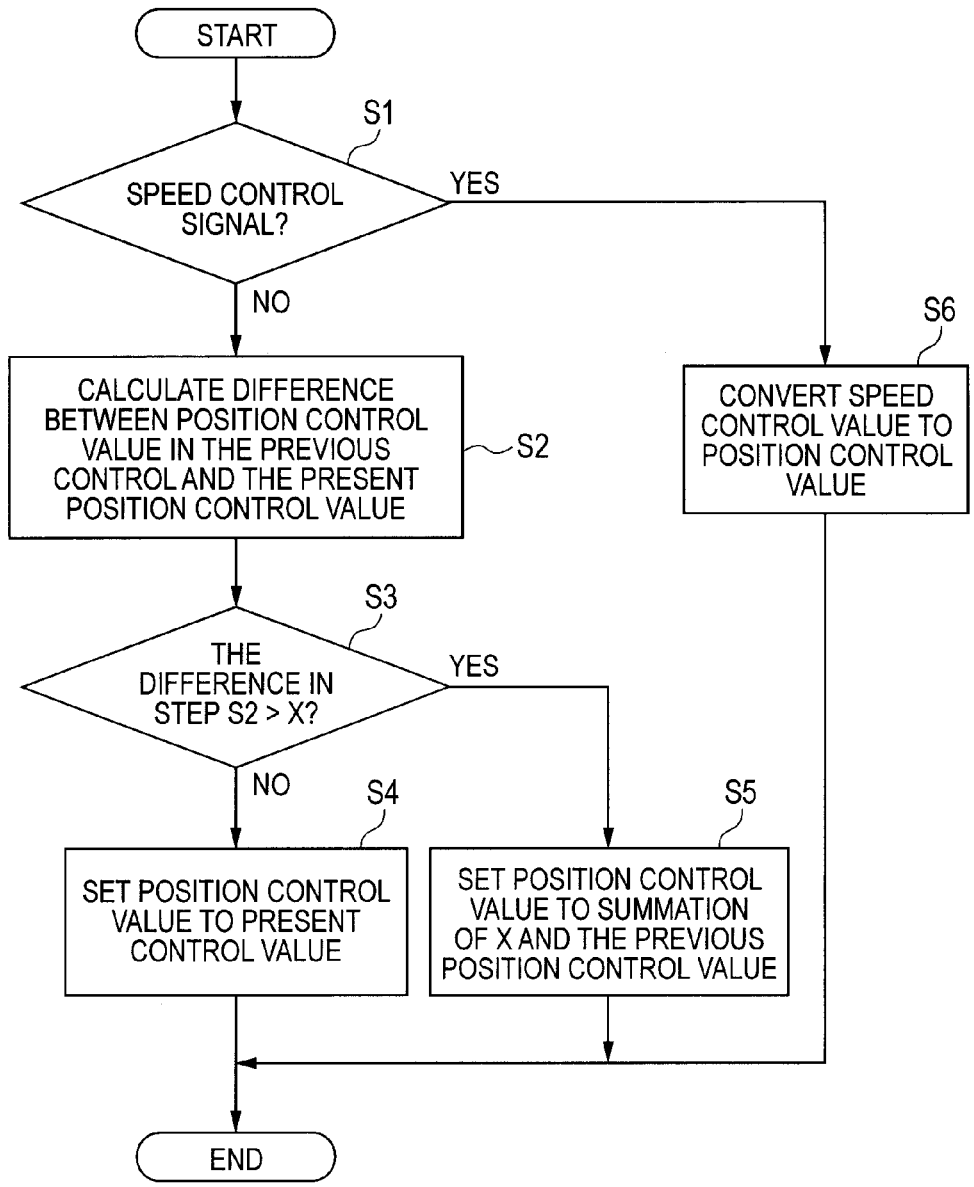
FIG. 2 is a flowchart of a zoom control recognition unit and a focus control recognition unit.

In addition, the lens apparatus 100 includes a zoom position control signal generator that generates a zoom position control signal for performing a zoom operation in the electric action and a focus position control signal generator that generates a focus position control signal for performing a focus operation. The zoom position control signal generator includes a zoom demand 200 as a zoom operation unit for performing the zoom operation, and a zoom control recognition unit 118. The focus position control signal generator includes a focus demand 300 serving as a focus operation unit for performing the focus operation, and a focus control recognition unit 119. The zoom control signal output from the zoom demand 200 and the focus control signal output from the focus demand 300 are supplied to the zoom control recognition unit 118 and the focus control recognition unit 119, respectively. The zoom control recognition unit 118 and the focus control recognition unit 119 output the input zoom control signal and focus control signal as position control signals (zoom position control signal and focus position control signal) that can be updated. A value of the zoom position control signal and a value of the focus position control signal (zoom position control value and focus position control value) indicate a position of the zoom lens and a position of the focus lens after performing the zoom operation and the focus operation, respectively. The zoom control recognition unit 118 and the focus control recognition unit 119 have a function of restricting an update amount for a position control signal if a change of the position control signal is so large that the position control signal can be reached only by a speed higher than a maximum drive speed at which the lens can be driven. FIG. 2 illustrates a flowchart of processes in the zoom control recognition unit 118 and the focus control recognition unit 119.

In Step S1, it is checked whether the input control signal is a speed control signal (speed command) or a position control signal (position command). If the input control signal is the speed control signal, a speed control value (value of the speed control signal) is converted into the position control value in Step S6, and the position control values of zoom and focus are determined. In addition, if the input control signal is the position control signal in Step S1, a difference between a position control value in the previous control and a present position control value is calculated in Step S2, and the process proceeds to Step S3.

In Step S3, an update amount (hereinafter, referred to as X) to be updated at the maximum drive speed at which the lens can be driven from a position control value (value of the position control signal) in the previous control is compared with the difference obtained by the calculation in Step S2. If the difference obtained in Step S2 is X or smaller, the process proceeds to Step S4, in which the input position control value is determined as the position control value to be used in the control as it is. In addition, if the difference obtained in Step S2 is larger than X in Step S3, the process proceeds to Step S5, in which X is added to the position control value in the previous control so that the sum is determined as the position control value to be used in the control.

According to the process of Steps S1 to S6, the zoom position control value and the focus position control value based on the input values from the zoom demand 200 and the focus demand 300 are not set to values outside ranges in which the respective lenses can reach with operable drive speed, respectively.

With reference to FIG. 1 again, the lens apparatus 100 includes a ROM 120 as a nonvolatile memory (angle-of-field data storing unit), which stores angle-of-field data 121 corresponding to zoom and focus positions. A first angle-of-field calculation unit 111, a second angle-of-field calculation unit 112, a third angle-of-field calculation unit 113, a zoom position control determination unit 115, and a base angle-of-field determination unit 114 perform calculations using the angle-of-field data 121.

Figure 3:
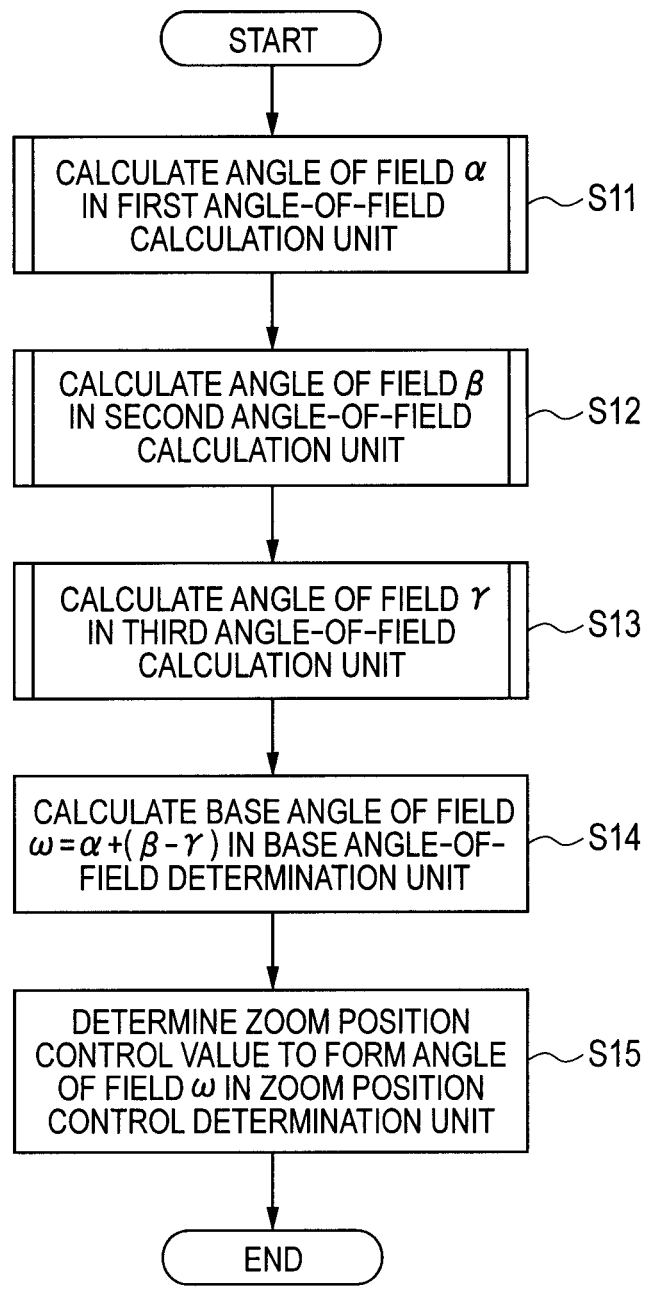
FIG. 3 is a flowchart among angle-of-field calculation units.

Those calculation units operate according to the flowchart illustrated in FIG. 3. In Step S11, the first angle-of-field calculation unit 111 calculates a present angle of field $\alpha$ (first angle of field) corresponding to the zoom follow signal generated by the zoom follow signal generator 109 and the focus follow signal generated by the focus follow signal generator 110, based on the angle-of-field data 121. Next, in Step S12, the second angle-of-field calculation unit 112 calculates an angle of field (second angle of field) corresponding to the zoom position control signal determined by the zoom control recognition unit 118 and the focus follow signal generated by the focus follow signal generator 110, based on the angle-of-field data 121. Next, in Step S13, the third angle-of-field calculation unit 113 calculates an angle of field $\gamma$ (third angle of field) corresponding to the zoom position control signal determined by the zoom control recognition unit 118 and the focus position control signal determined by the focus control recognition unit 119, based on the angle-of-field data 121.

In Step S14, the base angle-of-field determination unit 114 determines a change in the angle of field (base angle of field $\omega$) to be imposed only on the zoom lens 101 so that an angle of field intended by the photographer to change via an operation amount of the zoom demand 200 is reflected on an angle of field of a resultant photographed image. Specifically, the base angle of field $\omega$ is determined based on the angles of field $\alpha$, $\beta$, and $\gamma$ calculated in Steps S11 to S13, by adding the angle of field $\alpha$ to the value obtained by subtracting the angle of field $\gamma$ from the angle of field $\beta$, namely from the following equation.

$$\omega = \alpha + (\beta - \gamma)$$

In Step S15, the zoom position control determination unit 115 calculates the zoom position control value for zooming to the angle of field $\omega$ determined by the angle-of-field determination unit 114, based on the angle-of-field data 121. A difference between the zoom position control value determined here and the zoom follow value is multiplied by a gain to generate a control signal in the zoom control generator 116, and the generated control signal is used for controlling the zoom lens driving motor 105 via the zoom motor driving circuit 107.

Next, processes in the first to third angle-of-field calculation units 111 to 113 are described.

Figure 4:
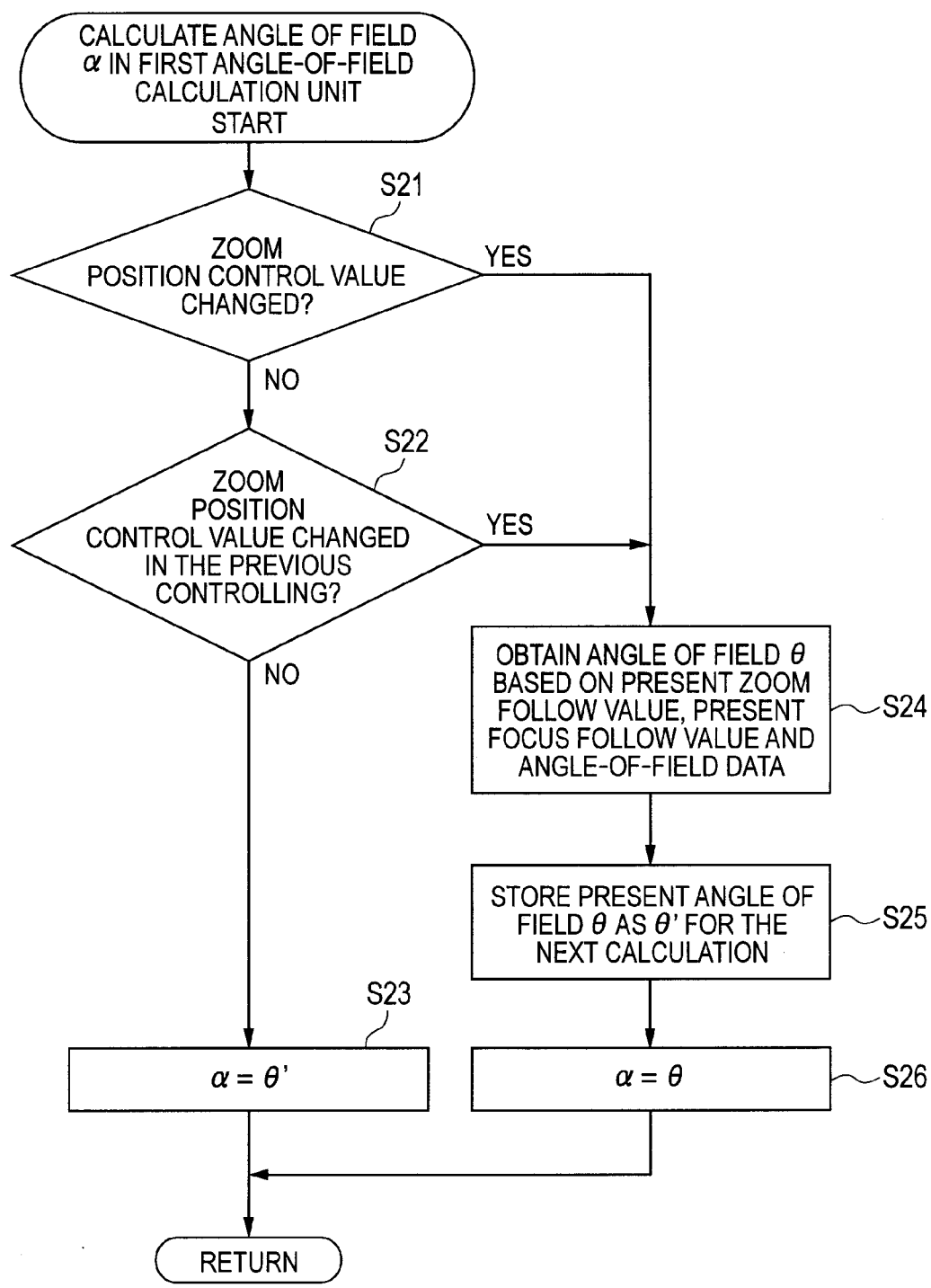
FIG. 4 is a flowchart of a process in a first angle-of-field calculation unit.

FIG. 4 is a flowchart illustrating a process of the first angle-of-field calculation unit 111.

In Step S21, it is judged whether or not there is a change in the zoom position control value. If there is a change, the process proceeds to Step S24. If there is no change in the zoom position control value, the process proceeds to Step S22.

In Step S22, it is determined whether or not there was a change in the zoom position control value in the previous calculation. If there was a change, the process proceeds to Step S24. If there was no change in the zoom position control value in the previous calculation, the process proceeds to Step S23 in which an angle of field $\theta'$ in the previous calculation is substituted into the angle of field $\alpha$. Then, the subroutine is finished, and the process returns to the routine that has called.

In Step S24, a present angle of field $\theta$ is calculated from the present zoom follow value, the present focus follow value, and the angle-of-field data 121. Then, the process proceeds to Step S25. In Step S25, the present angle of field $\theta$ is stored as $\theta'$ for the next calculation ($\theta'=\theta$). After that, in Step S26, the present angle of field $\theta$ is substituted into the angle of field $\alpha$. Then, the subroutine is finished, and the process returns to the routine that has called.

FIG. 5 is a flowchart illustrating a process of the second angle-of-field calculation unit 112.

In Step S31, it is determined whether or not there is a change in the zoom position control value. If there is no change, the process proceeds to Step S32, in which the current zoom follow value is set to the zoom position control value. Then, the process proceeds to Step S33. In Step S31, if there is a change in the zoom position control value, the process proceeds to Step S33. In Step S33, the angle of field $\beta$ is calculated from the zoom position control value, the present focus follow value, and the angle-of-field data 121.

FIG. 6 is a flowchart illustrating a process of the third angle-of-field calculation unit 113.

In Step S41, it is determined whether the focus lens 102 is driven by electric or manual. If the drive is electric, the process proceeds to Step S42. In Step S42, it is checked whether or not the focus position control value has been updated from the previous calculation. If the value has been updated, the process proceeds to Step S44. If the value has not been updated, the process proceeds to Step S43. If the focus lens drive is manual in Step S41, the process proceeds to Step S43.

In Step S43, the present focus follow value is set to the focus position control value, and the focus control signal is determined. Then, the process proceeds to Step S44, in which the angle of field $\gamma$ is calculated from the zoom position control value, the focus position control value, and the angle-of-field data 121.

FIGS. 7 to 10 are graphs illustrating the change in the angle of field in the vertical axis while the horizontal axis represents time, when a zoom demand thumb ring is operated or is not operated, and specifically, a target change in the angle of field (angle of field $\beta$ calculated by the second angle-of-field calculation unit 112), a change in the angle of field due to focus movement (angle of field $\gamma$ calculated by the third angle-of-field calculation unit 113), a change in the angle of field in the case of no correction (angle of field of $\beta+\gamma-\alpha$), and a change in the angle of field due to zoom movement after the correction (angle of field $\omega$ calculated by the base angle-of-field determination unit 114). Here, for easy understanding, it is supposed that a lean angle of the zoom demand thumb ring is constant in zoom demand operation and that the change in the angle of field of the lens is linear.

With reference to FIGS. 7 to 10, the change in the angle of field is compared between the case where zoom control is performed at the zoom position calculated by the zoom position control determination unit 115 (hereinafter, referred to as corrected case) and the case where the zoom control is not performed.

Figure 7:
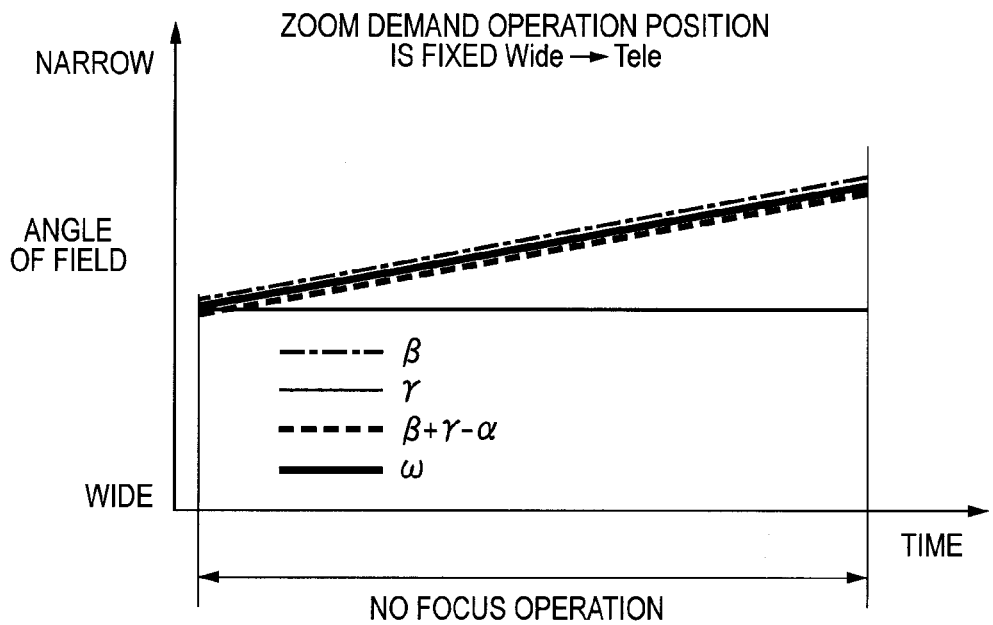
FIG. 7 is a graph illustrating a change in an angle of field (with no focus operation).

FIG. 7 illustrates the case where the focus is not activated, the lean angle of the thumb ring of the zoom demand 200 is constant, and the angle of field changes linearly according to the lean angle of the thumb ring of the zoom demand. In this case, because the focus lens is not moved, there is no change of the angle of field $\gamma$ due to focus driving. Therefore, it is not necessary to correct the zoom position control value due to the lean angle of the thumb ring of the zoom demand 200, and there is no difference of the change in the angle of field of the zoom due to the correction.

Figure 8:
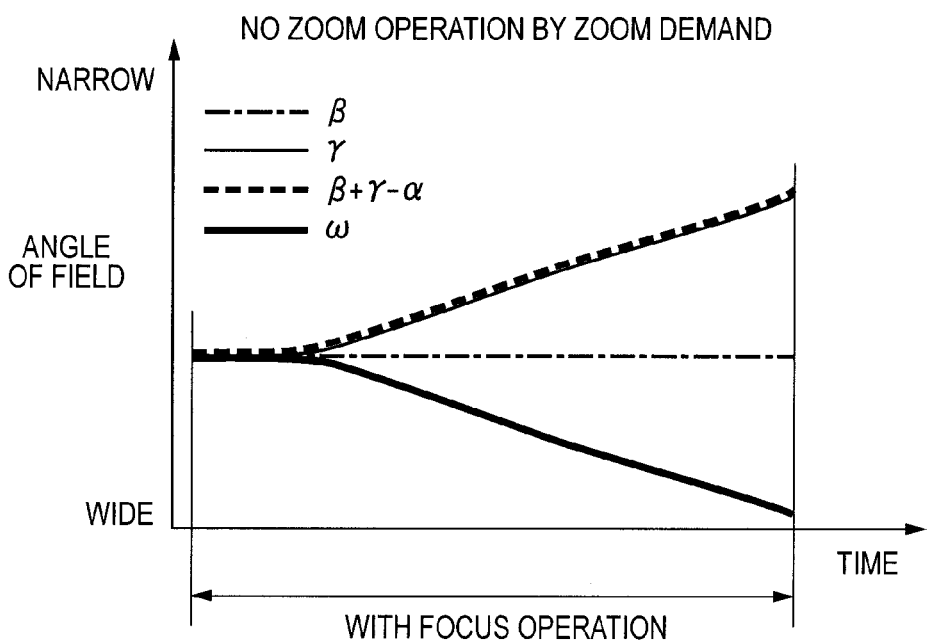
FIG. 8 is a graph illustrating a change in the angle of field (with no zoom operation).

FIG. 8 illustrates the case where there is no thumb ring operation of the zoom demand 200, and the focus is operated electrically or manually. There is no zoom operation by operating the zoom demand 200 for intentionally changing the angle of field. Therefore, the angle of field before the focus operation (illustrated in the diagram by a dashed dotted line) is a target angle of field. The zoom lens is driven to the zoom position corresponding to the base angle of field $\omega$ determined by the base angle-of-field determination unit so that the target angle of field is achieved. As a result, despite of the change in the angle of field due to the focus driving, the target angle of field $\beta$ as the angle of field intended by the photographer can be sustained.

FIG. 9 illustrates the change in the angle of field in the case where the zoom operation is performed at a constant lean angle of the thumb ring of the zoom demand 200 (the photographer wants to change the angle of field at a constant change speed), and the focus is operated or stopped electrically or manually during the zoom operation. In addition, FIG. 9 illustrates the case where the direction of the change in the angle of field due to the focus operation is the same as the direction of the change in the angle of field due to the zoom operation, in other words, the case where there is the change in the angle of field in the direction in which the angle of field is decreased, namely the image is enlarged. Compared with the target change in the angle of field ($\beta$; a dashed dotted line), the angle of field in the case of no correction (dotted line) changes more largely by the focus operation than the angle of field in the case of operating only by the zoom demand. In contrast, the zoom lens is driven to the zoom position corresponding to the base angle of field $\omega$ determined by the base angle-of-field determination unit so that the target angle of field is achieved. As a result, despite of the change in the angle of field due to the focus driving, the target angle of field $\beta$ can be realized.

Similarly to FIG. 9, FIG. 10 illustrates the change in the angle of field in the case where the zoom operation is performed at a constant lean angle of the thumb ring of the zoom demand 200 (the photographer wants to change the angle of field at a constant change speed), and the focus is operated electrically or manually during the zoom operation. However, FIG. 10 illustrates the case where the direction of the change in the angle of field due to the focus operation is opposite to the direction of the change in the angle of field due to the zoom operation. In other words, FIG. 10 illustrates the case where the direction of the change in the angle of field due to the focus is the direction in which the angle of field decreases, namely in the direction in which the image is enlarged, while the direction of the change in the angle of field due to the zoom is the direction in which the angle of field increases, namely in the direction in which the image is reduced. Compared with the target change in the angle of field β, the angle of field in the case of no correction (dotted line) changes in the direction opposite to the direction of the change in the angle of field in the case of operating only by the zoom demand when the focus is operated.

In contrast, the zoom lens is driven to a zoom position corresponding to the base angle of field ω determined by the base angle-of-field determination unit 114 so that the target angle of field is achieved. As a result, despite of the change in the angle of field due to the focus driving, the target angle of field β can be realized.

In the first embodiment, it is considered the case where the zoom control values are the speed control value and the position control value as control values from the zoom demand, but the effect of the present invention can be obtained also in the case of a combination of a position control value and a speed control value that are used in a preset function to a target position.

Second Embodiment

Figure 11:
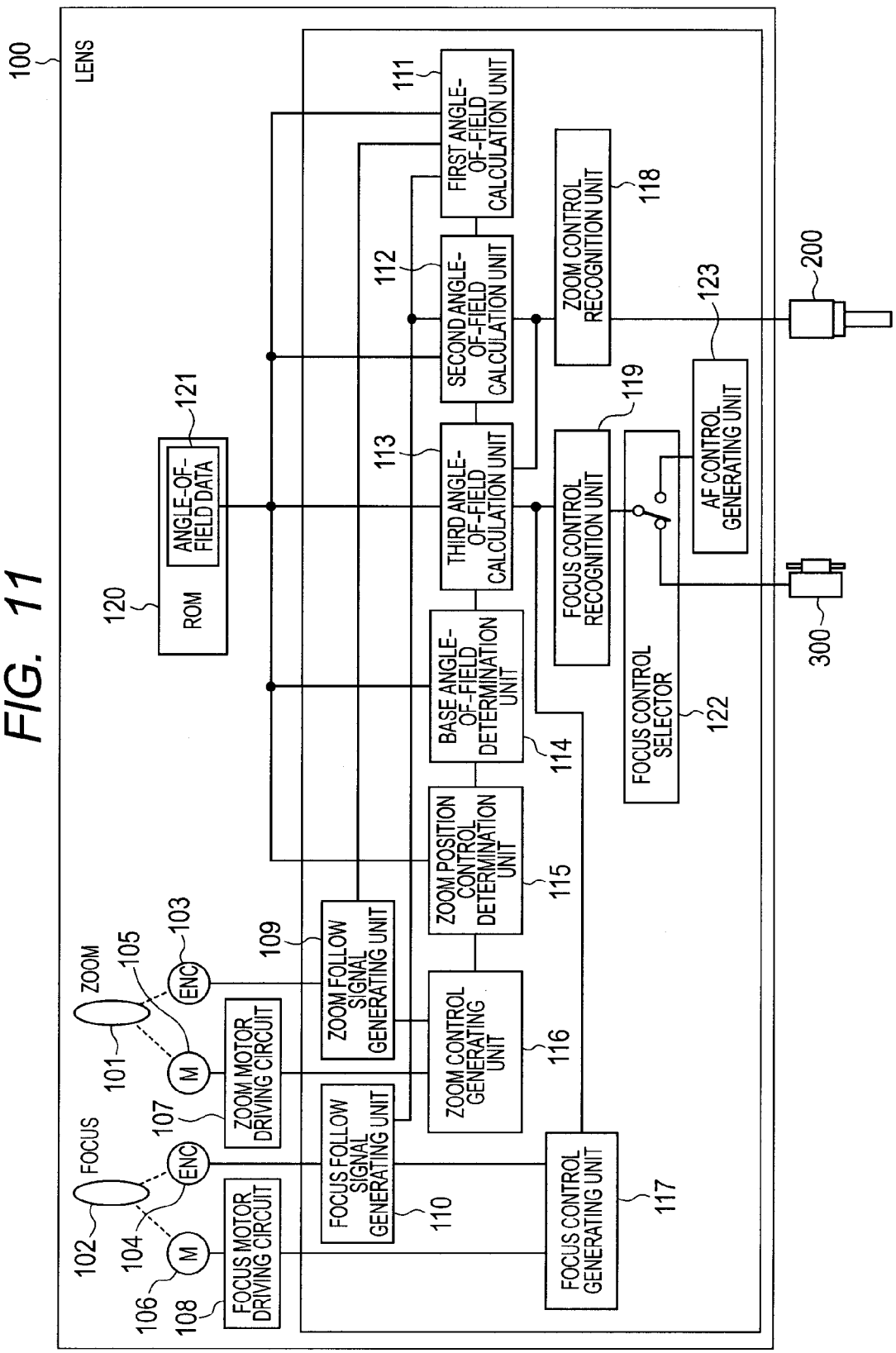
FIG. 11 is a block diagram of a second embodiment of the present invention.

Hereinafter, with reference to FIG. 11, a lens structure according to the second embodiment of the present invention is described. The second embodiment is different from the first embodiment in that the focus control signal generator further includes a focus control signal selecting unit 122, and an AF control generator 123 that generates a focus control signal for performing autofocus adjustment control.

One of the control signal of the focus demand 300 and the control signal of the AF control generator 123 is selected by the focus control signal selecting unit 122 and is supplied to the focus control recognition unit 119. Also in the case where the focus control signal selecting unit 122 selects the focus control signal of the AF control generator 123, the change in the focus angle of field can be corrected in the zoom operation in the same manner as in the case where the control signal of the focus demand 300 is selected.

As described above in the embodiments, according to the lens apparatus of the present invention, even if zoom and focus are operated simultaneously, it is possible to stably realize the angle of field intended by the photographer.

In addition, it is possible to realize a camera system including the lens apparatus of the present invention and a camera device for picking up a subject image formed by the lens apparatus, which can realize the angle of field intended by the photographer even if zoom and focus are operated simultaneously.

The exemplary embodiments of the present invention have been described above. However, the present invention is not limited to the embodiments, and various modifications and alterations may be made thereto within the scope of the spirit of the present invention.

For instance, the present angle of field α (first angle of field) corresponding to the zoom follow signal and the focus follow signal is calculated based on the angle-of-field data in the embodiments described above, but it is possible to calculate the angle-of-field data a (first angle of field) directly from the zoom follow signal and the focus follow signal without using the angle-of-field data. In the same manner, the angle of field β (second angle of field) may be calculated directly from the zoom position control signal and the focus follow signal, and the angle of field γ (third angle of field) may be calculated directly from the zoom position control signal and the focus position control signal. In this case, processing speed is decreased because calculation processing amount increases, but the ROM 120 for storing the angle-of-field data (angle-of-field data storing unit) becomes unnecessary so that the structure of the lens apparatus can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283504, filed Dec. 20, 2010, which is hereby incorporated by reference herein in its entirety.

What is claimed is:

1. A lens apparatus, comprising:
a zoom lens;
a focus lens;
a zoom driving unit for driving the zoom lens;
a zoom position detector for detecting a position of the zoom lens;
a focus position detector for detecting a position of the focus lens;
a zoom position control signal generator for generating a zoom position control signal indicating a position of the zoom lens;
a focus position control signal generator for generating a focus position control signal indicating a position of the focus lens;
a first angle-of-field calculation unit for calculating a first angle of field as a present angle of field based on the position of the zoom lens from the zoom position detector and the position of the focus lens from the focus position detector;
a second angle-of-field calculation unit for calculating a second angle of field based on the position of the zoom lens indicated by the zoom position control signal and the position of the focus lens from the focus position detector;
a third angle-of-field calculation unit for calculating a third angle of field based on the position of the zoom lens indicated by the zoom position control signal and the position of the focus lens indicated by the focus position control signal, which are used when the second angle-of-field calculation unit calculates;
a base angle-of-field determination unit for determining a sum of the first angle of field and a value obtained by subtracting the third angle of field from the second angle of field, as a base angle of field; and
a zoom position control determination unit for determining the position of the zoom lens to a position of the zoom lens corresponding to the base angle of field,
wherein the zoom driving unit drives the zoom lens to the position of the zoom lens determined by the zoom position control determination unit.

2. A lens apparatus according to claim 1, wherein:
the zoom position control signal generator includes a zoom operation unit and a zoom control recognition unit;
the focus position control signal generator includes a focus operation unit and a focus control recognition unit;
a zoom control signal output from the zoom operation unit to the zoom control recognition unit is of speed command or position command;
a focus control signal output from the focus operation unit to the focus control recognition unit is of speed command or position command;

the zoom position control signal output from the zoom control recognition unit is of position command; and the focus position control signal output from the focus control recognition unit is of position command.

3. A lens apparatus according to claim 2, further comprising:
a focus control signal selecting unit; and
an AF control generator for outputting a focus control signal for performing autofocus adjustment,
wherein the focus control signal selecting unit selects one of the focus position control signal from the focus operation unit and the focus control signal from the AF control generator, as the focus control signal.

4. A lens apparatus according to claim 3, further comprising:
a zoom control recognition unit for outputting a zoom position control signal within a range that allows update at a maximum drive speed of the zoom lens by the zoom driving unit, based on a signal from the zoom operation unit; and
a focus control recognition unit for outputting a focus position control value within a range that allows update at a maximum drive speed of the focus lens by the focus driving unit, based on the focus control signal from the focus operation unit or the focus control signal from the AF control generator.

5. A lens apparatus, comprising:
a zoom lens;
a focus lens;
a zoom driving unit for driving the zoom lens;
a zoom position detector for detecting a position of the zoom lens;
a focus position detector for detecting a position of the focus lens;
a zoom position control signal generator for generating a zoom position control signal indicating a position of the zoom lens;
a focus position control signal generator for generating a focus position control signal indicating a position of the focus lens;
an angle-of-field data storing unit for storing angle-of-field data determined from a position of the zoom lens and a position of the focus lens;
a first angle-of-field calculation unit for calculating a first angle of field as a present angle of field based on the position of the zoom lens from the zoom position detector, the position of the focus lens from the focus position detector, and the angle-of-field data;
a second angle-of-field calculation unit for calculating a second angle of field based on the position of the zoom lens indicated by the zoom position control signal, the position of the focus lens from the focus position detector, and the angle-of-field data;

a third angle-of-field calculation unit for calculating a third angle of field based on the position of the zoom lens indicated by the zoom position control signal and the position of the focus lens indicated by the focus position control signal, and the angle-of-field data, which are used when the second angle-of-field calculation unit calculates;
a base angle-of-field determination unit for determining a sum of the first angle of field and a value obtained by subtracting the third angle of field from the second angle of field, as a base angle of field; and
a zoom position control determination unit for determining the position of the zoom lens to a position of the zoom lens corresponding to the base angle of field,
wherein the zoom driving unit drives the zoom lens to the position of the zoom lens determined by the zoom position control determination unit.

6. A camera system, comprising:
the lens apparatus including a zoom lens, a focus lens, a zoom driving unit for driving the zoom lens, a zoom position detector for detecting a position of the zoom lens, a focus position detector for detecting a position of the focus lens, a zoom position control signal generator for generating a zoom position control signal indicating a position of the zoom lens, a focus position control signal generator for generating a focus position control signal indicating a position of the focus lens, a first angle-of-field calculation unit for calculating a first angle of field as a present angle of field based on the position of the zoom lens from the zoom position detector and the position of the focus lens from the focus position detector, a second angle-of-field calculation unit for calculating a second angle of field based on the position of the zoom lens indicated by the zoom position control signal and the position of the focus lens from the focus position detector, a third angle-of-field calculation unit for calculating a third angle of field based on the position of the zoom lens indicated by the zoom position control signal and the position of the focus lens indicated by the focus position control signal, which are used when the second angle-of-field calculation unit calculates, a base angle-of-field determination unit for determining a sum of the first angle of field and a value obtained by subtracting the third angle of field from the second angle of field, as a base angle of field, and a zoom position control determination unit for determining the position of the zoom lens to a position of the zoom lens corresponding to the base angle of field; and
a camera device for picking up a subject image formed by the lens apparatus,
wherein the zoom driving unit drives the zoom lens to the position of the zoom lens determined by the zoom position control determination unit.

* * * * *